United States Patent [19]

Kobari et al.

[11] 4,445,216

[45] Apr. 24, 1984

[54] SYSTEM FOR DEFEATING ERRONEOUS CORRECTION IN A DIGITAL SIGNAL REPRODUCING APPARATUS

[75] Inventors: Harukuni Kobari, Yokohama; Yasuhiro Yamada, Fujisawa; Susumu Suzuki; Chitoshi Hibino, both of Yokohama, all of Japan

[73] Assignee: Victor Company of Japan, Ltd., Yokohama, Japan

[21] Appl. No.: 242,293

[22] Filed: Mar. 10, 1981

[30] Foreign Application Priority Data

Mar. 10, 1980 [JP] Japan ................................. 55-30133

[51] Int. Cl.³ ............................................. G06F 11/10
[52] U.S. Cl. ..................................................... 371/39
[58] Field of Search .............................. 371/39, 40, 38

[56] References Cited

U.S. PATENT DOCUMENTS 4,151,510 4/1979 Howell et al. ........................ 371/40
4,281,355 7/1981 Wada et al. ...................... 371/40 X
4,306,305 12/1981 Doi et al. ............................. 371/38
4,330,860 5/1982 Wada et al. ...................... 371/39 X

OTHER PUBLICATIONS

IBM J. Res. Develop., vol. 24, No. 1, pp. 32-42.

Primary Examiner—David H. Malzahn
Attorney, Agent, or Firm—Louis Bernat

[57] ABSTRACT

A system for defeating erroneous correction in a digital signal reproducing apparatus. The system includes a reproducing circuit for reproducing a signal sequence in which information words and error correcting words are interleaved. A memory stores the reproduced digital signal sequence and produces a digital signal sequence made up of the information words and error correcting words, which are then de-interleaved and arranged in an original sequence. A correcting circuit corrects adjacent errors with respect to the digital signal sequence produced from the memory. A digital-to-analog converter converts a digital information signal obtained from the correcting circuit into an original analog information signal. The correcting circuit calculates partial syndromes according to predetermined equations and detects the number of erroneous words in one block which is made up of interleaved words. The error correcting operation is stopped when there are certain set of conditions which are related to the values of the partial syndromes and when the number of erroneous words are satisfied. The system continues to stop the correcting operation until other sets of conditions are satisfied, in order to correct errors of up to two words in each of the blocks made up of the de-interleaved words.

2 Claims, 8 Drawing Figures

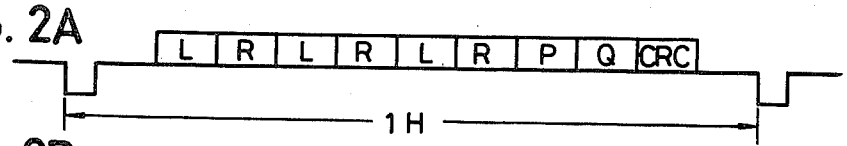
FIG. 2A
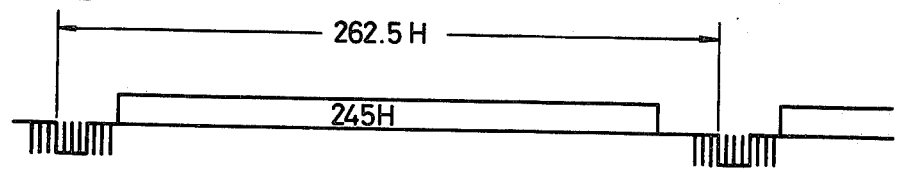
FIG. 2B
FIG. 3C
| | L0 | R0 | L1 | R1 | L2 | R2 | P | Q |
|---|---|---|---|---|---|---|---|---|
| | W1 | | | | | | | |
| | W7 | | | | | | | |
| | W13 | | | | | | | |
| | W19 | W2 | | | | | | |
| | W25 | W8 | | | | | | |
| | W31 | W14 | | | | | | |
| | W37 | W20 | W3 | | | | | |
| | W43 | W26 | W9 | | | | | |
| | W49 | W32 | W15 | | | | | |
| | | W38 | W21 | W4 | | | | |
| | | W44 | W27 | W10 | | | | |
| | | W50 | W33 | W16 | | | | |
| | | | W39 | W22 | W5 | | | |
| | | | W45 | W28 | W11 | | | |
| | | | W51 | W34 | W17 | | | |
| | | | | W40 | W23 | W6 | | |
| | W97 | | | W46 | W29 | W12 | | |
| | | | | W52 | W35 | W18 | | |
| | | | | | W41 | W24 | P1 | |
| | W115 | W98 | W81 | W64 | W47 | W30 | P2 | |
| | | | | | W53 | W36 | P3 | |
| | W127 | | | | | W42 | P4 | Q1 |
| | W139 | W122 | W105 | W88 | W71 | W54 | P6 | Q3 |
| | | | | | | W60 | P7 | Q4 |
| | | | | | | | P8 | Q5 |
| | | W140 | W123 | W106 | | | P9 | Q6 |
| | | | | | | | | Q7 |
| | | | | | | | | Q8 |
| | | | | W141 | W124 | | | Q9 |

FIG. 3A

| W1 | W2 | W3 | W4 | W5 | W6 | P1 | Q1 |
|----|----|----|----|----|----|----|----|
| W7 | W8 | W9 | W10 | W11 | W12 | P2 | Q2 |
| W13 | W14 | W15 | W16 | W17 | W18 | P3 | Q3 |
| W19 | W20 | W21 | W22 | W23 | W24 | P4 | Q4 |
|   |   |   |   |   |   |   |   |
|   |   |   |   |   |   |   |   |
|   |   |   |   |   |   |   |   |
|   |   |   |   |   |   |   |   |

FIG. 3B

| | | | | | | | |
|---|---|---|---|---|---|---|---|
| W1 | | | | | | | |
| W7 | | | | | | | |
| W13 | | | | | | | |
| W19 | W2 | | | | | | |
| W25 | W8 | | | | | | |
| W31 | W14 | | | | | | |
| W37 | W20 | W3 | | | | | |
| W43 | W26 | W9 | | | | | |
| | W32 | W15 | | | | | |
| | W38 | W21 | W4 | | | | |
| | W44 | W27 | W10 | | | | |
| | | W33 | W16 | | | | |
| | | W39 | W22 | W5 | | | |
| | | W45 | W28 | W11 | | | |
| | | | W34 | W17 | | | |
| | | | W40 | W23 | W6 | | |
| | | | W46 | W29 | W12 | | |
| | | | | W35 | W18 | | |
| | | | | W41 | W24 | P1 | |
| | | | | W47 | W30 | P2 | |
| | | | | | W36 | P3 | |
| W127 | W110 | W93 | W76 | W59 | W42 | P4 | Q1 |
| W133 | W116 | W99 | W82 | W65 | W48 | P5 | Q2 |
| W139 | W122 | W105 | W88 | W71 | W54 | P6 | Q3 |
| | | | | | | | Q4 |

3H, 3H (row spacing indicators on left)

FIG.4

|   |    | NUMBER OF ERRONEOUS WORDS | KINDS OF ERRONEOUS WORDS |
|---|----|---------------------------|--------------------------|
|   |    | 0 W                       |                          |
| D₁ | 3H | 1 W                      | Q                        |
| D₂ | 3H | 2 W                      | P, Q                     |
| D₃ | 3H | 3 W                      |                          |
| D₄ | 3H | 4 W                      |                          |
| D₅ | 3H | 5 W                      |                          |
| D₆ | 3H | 6 W (2W)                 | (L₀, R₀)                 |
| D₇ | 3H | 7 W (1W)                 | (L₀)                     |
|   |    | 0 W                       |                          |

TIME ↓

|   | 0 W       |          |
|---|-----------|----------|
| D₁ | 1 W      | Q        |
| D₂ | 2 W      | P, Q     |
| D₃ | 3 W      |          |
| D₄ | 4 W      |          |
| D₅ | 5 W      |          |
| D₆ | 6 W (2W) | (L₀, R₀) |
| D₇ | 7 W (1W) | (L₀)     |
|   | 0 W      |          |

SYSTEM FOR DEFEATING ERRONEOUS CORRECTION IN A DIGITAL SIGNAL REPRODUCING APPARATUS

BACKGROUND OF THE INVENTION

The present invention generally relates to a system for defeating erroneous correction in a digital signal reproducing apparatus, and more particularly to a system for defeating erroneous correction in a digital signal reproducing apparatus using an adjacent error correction which uses error pointers. Such error pointers may be obtained by an error detection code to perform corrections of up to two words (vectors) in one block, where the system for defeating erroneous correction is capable of preventing errroneous correction from being performed and further reducing the abnormal noise generated upon erroneous correction, by stopping the above adjacent code correction operation when the number of words (vectors) which are error-detected by the above error detection code and partial syndromes respectively assume certain values or until the member of error-detecting words and the partial syndromes respectively assume certain values in a following block.

In known recording and reproducing apparatus which record and reproduce an analog audio signal on and from a travelling magnetic tape by means of a stationary head, there have unavoidably been a number of problems such as the introduction of wow and flutter in the tape travel and noise and distortion arising in the tape and head systems. As a natural consequence, these problems impose limitations when improving the quality of recording and reproducing audio signals.

Accordingly, a method which converts an analog audio signal into a modulated digital signal (hereinafter simply referred to as "digital signal") by a modulation method such as pulse code modulation (PCM) and recording and reproducing this digital signal has been developed. By this method, problems such as those relating to the S/N ratio and distortion due to non-linearity of the recording medium are solved to a considerable degree.

In order to record and reproduce this digital signal, recording and reproducing systems having a wider frequency band or greater number of channels in comparison with those of a system for recording and reproducing analog signals, are required. Accordingly, a method in which a so-called video tape recorder (hereinafter referred to as VTR) which has heretofore been widely sold on the market as an apparatus for recording and/or reproducing composite video signals is used as the above recording and reproducing apparatus, has been realized. The term "composite video signal" is used in the present specification to designate a signal which results from the addition of synchronizing signals such as a vertical synchronizing signal, equalizing pulses, and a horizontal synchronizing signal to a video information signal. A VTR of this type is capable of recording and/or reproducing video signals having a wide frequency band by means of rotary heads which trace with a relatively high relative tracing speed over oblique tracks on a traveling magnetic tape.

Recording of an audio signal by using this VTR is accomplished by coverting the analog audio signal which is to be recorded into a digital signal, and inserting this digital signal between synchronizing signals which are the same as the synchronizing signals of an ordinary composite video signal, in an adapter apparatus connected to the VTR, to supply the composite digital signal thus obtained to the VTR, and record this signal on the magnetic tape by means of rotary heads. At the time of reproduction, the signal reproduced from the magnetic tape by the rotary heads in the VTR is supplied to the adapter apparatus, wherein the synchronizing signals are eliminated, and the resulting digital signal is converted into an analog signal, thereby being restored to the original audio signal.

In the case where dust particles are adhered to the surface of the above mentioned magnetic tape, or in the case where irregularities exist in the magnetic material of the magnetic tape, a signal loss or dropout occurs in one portion of the reproduced signal. In the case where such signal dropout occurs, and the most significant bit (MSB) is not reproduced, for example, the signal obtained by decoding will have a considerably large error value. If this signal is converted into an analog signal and reproduced, as it is, it will be accompanied by a high noise voltage, and the reproduced sound will have an unsatisfactory sound quality.

As a countermeasure, an interleaving system has heretofore been adopted. In a digital signal processing system adopting this interleaving system, the input analog signal is sampled every appropriate period in time in a sampling-and-holding circuit, and the resulting sampled signal is converted into a modulated digital signal in an analog to digital (A/D) converter. This modulated digital signal is fed into a memory in which the data write-in and read-out operations are controlled by a control pulse, and a sequence of word groups are arranged where the words obtained for every one sample of the digital signal respectively interleave with each other being separated from each other by a period of 10-odd H (H denotes one horizontal synchronizing period). Here, "one word" refers to the combination of bits obtained from one sample. The period of time represented by 10-odd H, is determined in conformance with the format.

A composite synchronizing signal is added to the signal thus obtained to produce a composite digital signal, which is then recorded on a magnetic tape by a VTR. This rearrangement of the order of data is referred to as "interleaving". Since the interleaving of data results in the distribution of the signal information, even when the recording or reproducing signal is deficient over one or more horizontal scanning (H) periods due to dropout, a related signal existing in another horizontal scanning period may be used to restore the original information.

A data part is extracted from the signal reproduced from the VTR. This data part, which undergoes wave-shaping, is then converted into a binary coded digital signal and thereafter supplied to a memory, where the signal are written in and read out responsive to a control pulse and restored back into the original order. This restoring of the signal back into the original order is hereinafter called "de-interleaving". The resulting signal is supplied to a digital to analog (D/A) converter where it is restored back into the original analog signal.

Thus, when a recording and/or reproducing system employing the above described VTR is used, a large number of code errors in the digital signal are generated, when dropout, jitter, noise, fluctuation in the reproduction level, interference between the codes, and the like exist due to dust particles and scratches existing on the magnetic tape. There are two types of code errors in the digital signal, mainly, the random error which is generated in a random manner, and the burst error which is generated in a bursted manner. Accordingly various types of code correction systems have been proposed which perform code correction upon de-interleaving with respect to these errors.

However, there has not been an effective sytem which prevents the erroneous correction in these error correction systems.

SUMMARY OF THE INVENTION

Accordingly, a general object of the present invention is to provide a novel and useful system for defeating erroneous correction in a digital signal reproducing apparatus in which the above described problems have been overcome.

Another and more specific object of the present invention is to provide a system for defeating erroneous correction applied to a digital signal reproducing apparatus comprising functions to correct up to two words (vectors) in one block by using error pointers, where the system prevents erroneous correction upon performing an adjacent error correction.

Still another object of the present invention is to provide a system for defeating erroneous correction in a digital signal reproducing apparatus, in which the correction of a block is stopped when all three partial syndromes are not zero as a result of a mathematical operation even when the number of words error-detected for every block unit by the error detecting word upon adjacent code correction are zero or one, and further, the state where above erroneous mathematical correction operation is stopped is maintained until the above partial syndromes all become zero where the number of error-detected words is zero, or until at least one of the above partial syndromes becomes zero where the number of error-detected words is zero or one, in the block which is error-detected by the above error detecting word for every block unit after the stopping of the above correction of the block. According to the system of the present invention, the erroneous correction generated by an erroneous operation due to the dropout of a word which should originally exist as an input word to the memory circuit, or the input of a non-related word, can be prevented. The generation of abnormal noise due to erroneous correction or disarrangement in the order of read out words can also be prevented. Furthermore, when the correction stopping period is long, the abnormal noise can be reduced by compensation means such as pre-holding means.

Further objects and features of the present invention will be apparent from the following detailed description when read in conjunction with the accompanying drawings.

BRIEF DESCRIPTION OF THE DRAWINGS

FIGS. 2A and 2B are diagrams respectively showing the data arrangement of the signal recorded by the system shown in FIG. 1;

FIGS. 3A, 3B, and 3C are diagrams respectively showing the word arrangement in a case where no interleaving is performed, a case where an interleaving of 3H is performed, and a case where a certain block has dropped out;

FIG. 4 is a diagram for explaining the errors in the words when the state shown in FIG. 3C is generated.

First, an embodiment of a digital signal recording and/or reproducing system applied with a system of the present invention, will be described in conjunction with FIG. 1.

Figure 1:
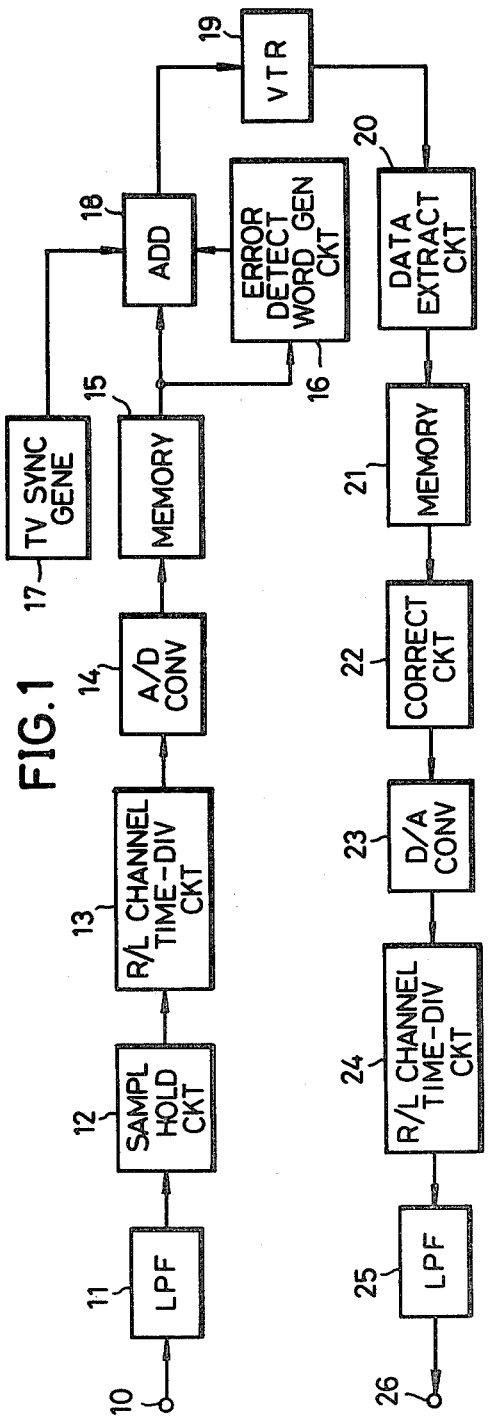
FIG. 1 is a systematic block diagram showing an embodiment of a digital signal recording and/or reproducing system applied with the system for defeating erroneous correction of the present invention.

In FIG. 1, an input analog signal, for example, two channel stereo audio signals, introduced through an input terminal 10 pass through a low-pass filter 11 wherein the high-frequency components of the signal thus applied are cut off in order to prevent the generation of folding noise, and are then supplied to a sampling-and-holding circuit 12 wherein the signal thus supplied are sampled at appropriate time intervals. The right and left channel signals of the above sampled signal undergo time-division at a right and left (R/L) channel time-division circuit 13. The time divided signal is then supplied to an analog-to-digital (A/D) converter 14 wherein the signal thus supplied is converted into a modulated digital signal (PCM signal in this case). This modulated digital signal is applied to a memory 15 wherein the write-in and read-out of data are performed, and the data are interleaved.

The output signal of the memory 15 is supplied to an adder 18. While on the other hand, the output signal of the memory 15 is supplied to an error detecting word generating circuit 16 wherein the error detecting word is generated. The adder 18 respectively multiplexes a composite synchronizing signal equal to the composite synchronizing signal included in the composite video signal generated by a television syncronizing signal generator 17, and the error detecting word generated by the generating circuit 16, with the digital signal supplied from the memory circuit 15, and supplies the signal to a VTR 19 as a signal having a signal format (hereinafter referred to as "video signal") in accordance with the standard composite video signal. The VTR 19 records this input video signal on the magnetic tape by forming similar tracks as those of the standard composite video signal.

The video signal which is recorded or reproduced by the VTR 19 comprises waveforms shown in FIGS. 2A and 2B. As sectionally shown in FIG. 2A, three of each sampling words L of the left-channel audio signal, three of each sampling words R of the right-channel audio signal, error correcting words P and Q formed from these six words, and an error detecting word CRC are time-divisionally multiplexed within one horizontal scanning period (1H). Each of the above words shown in FIG. 2A are similarly arranged within one field having a period of 262.5H, within a period of 245H as sectionally shown in FIG. 2B.

The data portion of the digital signal reproduced by the VTR 19 is extracted and undergoes wave-shaping at a data extracting circuit 20, and is then supplied to a memory 21 after being converted into a binary coded digital signal. The data write-in and data read-out are performed, and de-interleaved at the memory 21. The data read out from the memory 21 are rearranged into the same order as that of the input data to the above memory 15. These data are supplied to a correcting circuit 22 wherein the erroneous data are corrected, and the correct data are supplied to a digital-to-analog (D/A) converter 23. The digital signal is converted back into the original analog signal at the D/A converter 23, and then supplied to a right and left (R/L) channel time-division circuit 24. The analog signal thus supplied to the R/L channel time-division circuit 24 is converted into continuous right and left channel signals, and obtained from an output terminal 26 through a low-pass filter 25.

The recording and reproduction of digital signals by use of the VTR was described above, and the interleaving and de-interleaving operation will now be briefly described. FIG. 3A shows a case where the data is arranged as it is without interleaving. The first data block is formed from six information words $W_1$ through $W_6$, error correcting words $P_1$ and $Q_1$, and the error detecting cyclical redundancy check (CRC) word (not shown). The next data block is formed from information words $W_7$ through $W_{12}$, error correcting words $P_2$ and $Q_2$ formed from these information words, and the error detecting word CRC (not shown). Similarly, each block is constituted successively in accordance with the change in the signal with respect to time, in the same order, as shown in FIG. 3A.

Accordingly, when the data are arranged in the order as they are without interleaving, an error introduced within a short period of time can be corrected, however, in the case of a burst error, the majority of the erroneous data within that period cannot be corrected. Hence, in order to realize a high correction factor with respect to the burst error, each information word is scattered instead of being arranged in the original order, and the so-called interleaving operation is performed by arranging the data block within separate horizontal scanning periods (hereinafter referred to as "H-period") instead of arranging within the same H-period.

FIG. 3B shows an example where each word is arranged so as to be separated by 3H. Generally, the interleaving interval D is called as an interleaving of 3H, and in actual digital signal recording and reproducing apparatus, an interleaving of 16H is commonly used. In FIG. 3B, each element within a square represents a word, and for example, in the row indicated by an arrow, the words $W_{133}$, $W_{116}$, $W_{99}$, $W_{82}$, $W_{65}$, $W_{48}$, $P_5$, and $Q_2$ form one block. Further, the empty squares in FIG. 3B represent words although not shown to simplify the diagram. Moreover, the illustration of the error detecting word CRC has been omitted.

By recording the digital signal by interleaving as described above, even when burst errors are generated, these errors can be treated as being random errors, to realize a high correction and restoration factor. However, when distortions exist in the vertical synchronizing signal or when errors are introduced in the timing control due to dropouts upon reproduction, to introduce error in the de-interleaving operation due to such causes as the disarrangement in the input order of the data supplied to the memory circuit 21 shown in FIG. 1, the arrangement and order of the de-interleaved digital signal is disarranged. Accordingly, when errors in the signal exist within the above interval, there is a possibility that an erroneous correction is performed in which erroneous mathematical operation is performed. For example, when considering a case in which the single block signal shown by the arrow in FIG. 3B has dropped out, the data supplied as input to the memory circuit 21 can be considered as being arranged within the memory circuit 21 as shown in FIG. 3C.

On the other hand, upon reproduction of a video signal which is edited in units of frames (there are types of VTRs which can electronically edit in units of frames), the error correction performed in the vicinity of the edited point will be performed erroneously, since the arrangement and order between words in the vicinity of the starting and ending points of the editing do not comply with the rule upon forming of the error correcting words.

Assuming that the input data to the correcting circuit 22 exist on the straight line extending obliquely from the upper left to the lower right hand side in FIG. 3C, the words are successively read out from the upper left to the lower right hand side in FIG. 3C. Accordingly, in a de-interleaving of 3H, the words are successively read out as $W_1$, $W_2$, $W_3$, ..., $W_6$, $W_7$, $W_8$, .... The blocks will be referred to by the name of the word in the column $L_0$ hereinafter. Thus, the correction performed up to block $W_1$ is correct, however, the combination of the words in blocks $W_7$ through $W_{127}$ differ from that of the original, within the read-out period (21H) of the blocks $W_7$ through $W_{127}$.

In the conventional reproducing apparatus, the correcting operation is performed when an erroneous word exists even within this interval of 21H, and abnormal noise was sometimes generated due to the erroneous correction performed by the correcting operation. Moreover, in a case where no erroneous word exists within this interval of 21H and when the correcting circuit 22 performs no correcting operations, the order with which the de-interleaved data are read out is disarranged due to the dropout of the block $W_{133}$. That is, the words are read out in the order $W_{43}$, $W_{44}$, $W_{45}$, $W_{46}$, $W_{47}$, $W_{54}$, $W_{49}$, $W_{50}$, $W_{51}$, $W_{52}$, $W_{53}$, $W_{60}$, ..., and the words indicated by the circle above are the words read out in the wrong order as that of the original. Accordingly, abnormal noise is generated within the read-out period of 15H in which the blocks $W_{43}$ through $W_{127}$ shown in FIG. 3C are read out.

The above description is for the case when the interleaving period D is 3H, however, in actual digital signal recording and/or reproducing apparatus, the interleaving interval D is 16H. In the case where the interleaving interval D is 16H, the section in which erroneous correction could be performed due to dropout of one block is 112H, and furthermore, the section in which abnormal noise could be generated due to disarrangement in the order of reading out of the data reaches approximately 80H. In addition, there was a possibility that abnormal noise could similarly be generated in the vicinity of the following vertical synchronizing signal.

Thus, the present invention provides a solution to the above described problems, and reduces the abnormal noise generated within the section in which the arrangement and order are different from those of the original, of the sections wherein the de-interleaved data are read out. One embodiment of such a system will now be described in conjunction with FIGS. 4 and 5.

Description will first be given on the adjacent error correction, since the present invention prevents the erroneous correction performed within the digital signal reproducing apparatus having a correcting circuit for performing adjacent error correction. One block signal is constituted from a total of 128 bits, that is, from information words (information vectors) $W_1$, $W_2$, ..., $W_6$ each comrising 14 bits having "0" and "1" as the element, error correcting words (error correcting vectors or checking vectors) P and Q each having 14 bits and formed as will be described later on, and the error detecting word CRC 16 bits. An example where the above system is applied to recording and reproduction of a video signal wherein 1H corresponds to 168 bits, will now be described. The error correcting words P and Q are respectively formed according to the following equations (1) and (2).

$$P = \sum_{i=1}^{6} W_i = W_1 \oplus W_2 \oplus W_3 \oplus W_4 \oplus W_5 \oplus W_6 \tag{1}$$

$$Q = \sum_{i=1}^{6} T^{7-i} W_i \tag{2}$$

$$= T^6 W_1 \oplus T^5 W_2 \oplus T^4 W_3 \oplus T^3 W_4 \oplus T^2 W_2 \oplus T W_6$$

$$(\text{or } T W_1 \oplus T^2 W_2 \oplus \ldots X \oplus T^6 W_6)$$

In the equations (1) and (2), the symbol $\Sigma o$ indicates the total sum of the modulo-two additions, $\oplus$ indicates a modulo-two addition, and furthermore, T indicates a companion matrix of the polynomial $1+x^8+x^{14}$.

Description on the above companion matrix T in the equation (2) will now be given. The companion matrix is defined as follows. That is, when a "field" comprising two elements is designated by GF(2), and an m-order polynomial G(x) is equal to $x^m + g_{m-1} x^{m-1} + \ldots + g_1 x + g_0$, the companion matrix T can be described by the following equation.

$$T = \begin{pmatrix} 0 & 0 & \ldots & \ldots & 0 & g_0 \\ 1 & 0 & & & 0 & g_1 \\ 0 & 1 & & & & \cdot \\ 0 & 0 & & & & \cdot \\ \cdot & \cdot & & & & \cdot \\ \cdot & \cdot & & & & \cdot \\ \cdot & \cdot & & & & 0 & g_{m-2} \\ 0 & 0 & \ldots & \ldots & 1 & g_{m-1} \end{pmatrix}$$

The above can be defined by designating the column vectors A and B having m elements on the field GF(2), by the equations $$A = (a_1, a_2, \ldots, a_m)^t$$

$$B = (b_1, b_2, \ldots, b_m)^t$$

where t indicates a transpose of a matrix. When these column vectors A and B are equated to polynomials $$\begin{cases} A(x) = a_m x^{m-1} + a_{m-1} x^{m-2} + \ldots + a_2 x + a_1 \\ B(x) = b_m x^{m-1} + b_{m-1} x^{m-2} + \ldots + b_2 x + b_1 \end{cases}$$

and the result of the operation $x \cdot A(x) \div G(x)$ is designated by B(x), the following equation stands.

$$B(x) = xA(x) \ominus a_m \cdot G_x = xA(x) \oplus a_m \cdot G(x)$$

$$= (a_{m-1} \oplus a_m \cdot g_{m-1}) x^{m-1} + (a_{m-2} \oplus a_m g_{m-2}) x^{m-2}$$

$$+ \ldots + (a_1 \oplus a_m g_1) x + a_m \cdot g_0$$

$$= b_m x^{m-1} + b_{m-1} x^{m-2} + \ldots + b_2 x + b_1$$

Accordingly, from the above equation, $b_1 = a_m \cdot g_0$, $b_2 = a_1 \oplus a_m g_1, \ldots,$ $b_m = a_{m-1} \oplus a_m g_{m-1}$ and these terms can be expressed by the following matrix.

$$\begin{pmatrix} b_1 \\ b_2 \\ \cdot \\ \cdot \\ \cdot \\ b_m \end{pmatrix} = \begin{pmatrix} 0 & 0 & \ldots & \ldots & 0 & g_0 \\ 1 & 0 & & & 0 & g_1 \\ 0 & 1 & & & & \cdot \\ \cdot & \cdot & & & & \cdot \\ \cdot & \cdot & & & & \cdot \\ 0 & 0 & \ldots & \ldots & 0 & 1 & g_{m-1} \end{pmatrix} \begin{pmatrix} a_1 \\ a_2 \\ \cdot \\ \cdot \\ \cdot \\ a_m \end{pmatrix}$$

Therefore, the equation $B = T \cdot A$ stands. Furthermore, $g_0$ must be equal to one since the companion matrix T is a regular matrix. This is because the first row of the above described companion matrix T all becomes all zeros when $g_0$ is equal to one, and the matrix T does not become a regular matrix.

Accordingly, the polynomial G(x) becomes equal to $x^m + g_{m-1} x^{m-1} + \ldots + g_1 x + 1$. Further, there is a condition that $(I \oplus T^{-k})^{-1}$ must exist upon correcting operation, where I designates a unit matrix. Hence, $(I \oplus T^{-k})$ must be regular, and the matrices I and $T^{-k}$ must be linearly independent. Moreover, the matrices I and $T^{-k}$ must also be linearly independent. Therefore, as a condition for the above polynomial G(x), at least one of the coefficients $g_{m-1}$ through $g_1$ must not be zero, and $T^1, T^2, \ldots, T^{n-1} \neq I$ must stand. In addition, $m = 14$, $g_8 = 1$, and $g_1 = g_2 = \ldots = g_7 = g_9 = \ldots = g_{13} = 0$ in the polynomial G(x), in this case.

When the equations (1) and (2) are rearranged, the following equations (3) and (4) are formed.

$$W_1 \oplus W_2 \oplus W_3 \oplus W_4 \oplus W_5 \oplus W_6 \oplus P = 0 \tag{3}$$

$$T^6 W_1 \oplus T^5 W_2 \oplus T^4 W_3 \oplus T^3 W_4 \oplus T^2 W_5 \oplus T W_6 \oplus Q = 0 \tag{4}$$

If the i-th word $W_i$ and the j-th word $W_j$ respectively and erroneously become $$W_i' = W_i \oplus E_i, \quad W_j' = W_j \oplus E_j \tag{5}$$

Where $E_i$ and $E_j$ respectively designate erroneous vectors, the equations (3) and (4) do not become equal to zero, and become equal to $S_1$ and $S_2$, respectively.

$$S_1 = P \oplus w_1 \oplus \ldots \oplus W_i' \oplus \ldots W_j' \oplus \ldots \oplus W_6 \tag{6}$$

$$= E_i \oplus E_j$$

$$S_2 = Q \oplus T^6 W_1 \oplus \ldots \oplus T^{7-i} W_i' \oplus \ldots \oplus T^{7-j} W_j' \oplus \ldots \oplus T W_6 \tag{7}$$

$$= T^{7-i} E_i \oplus T^{7-j} E_j$$

In the above equations (6) and (7), it is assumed that i and j respectively are not equal to one and six, however, i and j can of course be equal to one and six, respectively. But these equations (6) and (7) also stand under these conditions.

Since $$E_i = S_1 \oplus E_j \tag{8}$$

from the equation (6), and by substituting the above equation (8) into the equation (7), the following equation can be formed.

$$S_2 = T^{7-i} (S_1 \oplus E_j) \oplus T^{7-j} E_j$$

Thus, by modifying this equation, $$T^{i-7}S_2 = S_1 \oplus E_j \oplus T^{i-j}E_j$$

$$S_1 \oplus T^{i-7}S_2 = (I \oplus T^{i-j})E_j$$

and therefore, $$E_j = (I \oplus T^{i-j})^{-1}(S_1 \oplus T^{i-7}S_2) \quad (9)$$

where I is a unit matrix. Accordingly, the erroneous vectors $E_i$ and $E_j$ can be calculated from the equations (8) and (9), and by respectively substituting these erroneous vectors into the equations (6) and (7), the correct i-th word $W_i$ and the j-th word $W_j$ can respectively be calculated and restored back into the original states.

In obtaining the partial syndromes $S_1$ and $S_2$ in the equations (6) and (7), the erroneous words were also added, however, when the erroneous words are not added, or a zero vector is added (the result is the same as when no erroneous words are added), the partial syndromes $S_1$ and $S_2$ become $$S_1 = W_i \oplus W_j$$

$$S_2 = T^{7-i}W_i \oplus T^{7-j}W_j$$

and from these two equations, the following equations can be formed.

$$W_j = (I \oplus T^{i-j})^{-1}(S_1 \oplus T^{i-7}S_2)$$

$$W_i = S_1 \oplus W_j$$

Therefore, by performing similar mathematical operations performed upon calculating the erroneous vectors $E_i$ and $E_j$, the i-th word $W_i$ and the j-th word $W_j$ can directly be calculated. Accordingly, in the following description, a case where the mathematical correcting operation is performed by a method in which the erroneous words are not added.

A case will now be considered where an erroneous de-interleaving operation is performed due to dropout of the data which should originally exist as an input data to the memory circuit 21 or due to a non-related data being supplied as input, in the above described adjacent error correction. The number of erroneous words within one block which is detected by the error detecting word CRC will be assumed to be N.

(I) In a case where N=0, however, a word $W'_i$ has been read out instead of the word $W_i$ due to deviation in the arrangement, the following equations can be formed from the equations (1) and (3) or the equations (2) and (4).

$$S_1 = W_i \oplus W'_i \neq 0, \ S_2 = T^{7-i}(W_i \oplus W'_i) \neq 0$$

When k is varied from one through six in the equation $S_{12} = S_1 \oplus T^{k-7}S_2$, the following equation stands when k=i.

$$\begin{aligned} S_{12} &= S_1 \oplus T^{i-7}S_2 \\ &= (W_i + W'_i) \oplus T^{i-7} \cdot T^{7-i}(W_i \oplus W'_i) \\ &= 0 \end{aligned}$$

Hence, the value of i which indicates which word has deviated, that is, which word is the erroneous word, can be discriminated, and the word $W_i$ can accordingly be corrected. This operation is called a syndrome correction.

On the other hand, when the one word having the deviated arrangement is not an information word, but an error correcting word P or Q, and when a word P' or Q' is read out, $$S_1 = P \oplus P', \ S_2 = 0, \ S_{12} = P \oplus P'$$

or $$S_1 = 0, \ S_2 = Q \oplus Q', \ S_{12} = T^{k-7}(Q \oplus Q')$$

and it can be discriminated that the error correcting word P or Q has deviated, that is, the error correcting word P or Q is in error. However, correction is not necessary with respect to the error correcting word P or Q.

(II) In a case where N=1, the erroneous word is $W_i$, and a word $W'_j$ has been read out instead of the information word $W_j$ due to deviation in the arrangement, $$S_1 = W_i \oplus (W_j \oplus W'_j) \neq 0, \ S_2 = T^{7-i}W_i \oplus T^{7-j}(W_j \oplus W'_j) \neq 0$$

and thus, the equation $$S_{12} = S_1 \oplus T^{k-7}S_2$$

(where k=1, 2, ..., 6)

generally becomes equal to the equation $$S_{12} = (I \oplus T^{j-i})W_i \neq 0$$

even when k=j. Accordingly, the value of j cannot be calculated, and therefore, the word $W_j$ cannot be restored. Moreover, the word $W_i$ cannot be corrected either. However, when the value of the word $W_i$ is zero, $S_{12} = 0$ when k=j, and the value of j can be calculated, but in this case, it can also be considered that the word $W_i$ did not originally exist within the one block, and this can be considered as the above syndrome correction in the above case (I).

(III) In a case where N=0, however, two information words $W'_i$ and $W'_j$ have been read out instead of the information words $W_i$ and $W_j$, $$S_1 = (W_i \oplus W'_i) \oplus (W_j \oplus W'_j) \neq 0$$

$$S_2 = T^{7-i}(W_i \oplus W'_i) \oplus T^{7-j}(W_j \oplus W'_j) \neq 0$$

$$S_{12} = S_1 \oplus T^{k-7}S_2 \neq 0$$

and it can be discriminated from the values of the partial syndromes $S_1$, $S_2$, and $S_{12}$ that two words have deviated within the one block. This is equivalent to the case where N=0, and three or more words have deviated. Accordingly, discrimination can be made on whether two or more words have deviated within the one block, from the values of the above partial syndromes $S_1$, $S_2$, and $S_{12}$.

(IV) In a case where no words have deviated, however, the word within the one block is in error, $S_1 = 0$, $S_2 = 0$, and $S_{12} = 0$ when N=0. But when N=1, $S_1 = E_i \neq 0$, $S_2 = T^{7-i}E_i \neq 0$, and $S_{12} = S_1 \oplus T^{i-7}S_2 = 0$ when the information word is in error, $S_1 = P \oplus P'$, $S_2 = 0$, and $S_{12} = P \oplus P' \neq 0$ when the error correcting word P is in error, and $S_1 = 0$, $S_2 = Q \oplus Q'$, and $S_{12} = T^{k-7}(Q \oplus Q') \neq 0$ when the error correcting word Q is in error. Furthermore, when $N \geq 2$, $S_1 \neq 0$, $S_2 \neq 0$, and $S_{12} \neq 0$.

Therefore, from the above four cases (I) through (IV), the deviation in the word cannot be detected from the values of the partial syndromes $S_1$, $S_2$, and $S_{12}$ when $N \geq 2$. However, when N=0 or N=1, and the partial syndromes $S_1$, $S_2$, and $S_{12}$ are not zero, it can be discriminated that one or more words have deviated within the one block, excluding a special case. In addition, the above special case is a case where a detection error has been introduced by the detection performed by the error detection word CRC.

In the system according to the present invention, the correction of a particular block is stopped when the number of words detected by the error detecting word CRC is zero or one, and the partial syndromes $S_1$, $S_2$, and $S_{12}$ are not ($S_1=0$, $S_2=0$, and $S_{12}=0$). Furthermore, the stopped state of the error correction is maintained until the partial syndromes $S_1$, $S_2$, and $S_{12}$ all become where the number of words error-detected in a following block is zero, or until at least one of the partial syndromes $S_1$, $S_2$, and $S_{12}$ becomes where the number of error-detected words is zero or one. Even when the number of words error-detected upon stopped period of the error correction is two or more, an erroneous correction is prevented.

The above stopping operation of the error correction will now be described for a case where the interleaving interval D shown in FIG. 3C is 3H. As shown in FIG. 4, in the first interleaving interval $D_1$ of 3H (three blocks), the number of erroneous words is one word (1W) where the erroneous word is Q. In the following interleaving interval $D_2$ of 3H (three blocks), the number of erroneous words is two word (2W) where the erroneous words are P and Q. Similarly, the number of erroneous words for the following interleaving intervals $D_3$ through $D_7$ are respectively three words (3W), four words (4W), five words (5W), six words (6W), and seven words (7W). However, when the number of erroneous words are six (6W) or seven (7W), the former can be regarded as being two erroneous words (2W) where the words $L_0$ and $R_0$ are the erroneous words with respect to the remaining words, and the latter can be regarded as being one erroneous word (1W) where the word $L_0$ is the erroneous word, and these numbers of words are shown in brackets in FIG. 4. Accordingly, the deviation is by one word within the interleaving intervals $D_1$ and $D_7$, and erroneous correction can substantially be prevented in cases where the error due to the deviation in the word is corrected or not corrected. Moreover, since deviations of two or more words exist in the interleaving intervals $D_2$ through $D_6$, the correcting operation is once stopped in a case where deviations of two or more words are detected, and erroneous correction can positively be prevented thereafter.

However, the interleaving interval D in an actual digital signal reproducing apparatus is 16H. Hence, the interval between the above interleaving intervals $D_2$ and $D_6$ is 80H (that is, 16H×5), and even when an erroneous correction is not performed, abnormal noise is reproduced since the de-interleaved words are reproduced in an order different from that of the original. Accordingly, in this case, a flag is provided in the information words which are read out upon the stopped period of the correcting operation, wherein the flag indicates that a deviation in the word exists. Thus, by using this flag to perform a known compensating operation such as a pre-holding operation or a muting operation (setting to zero level) upon the stopped period of the correcting operation, the abnormal noise can be reduced.

Figure 5:
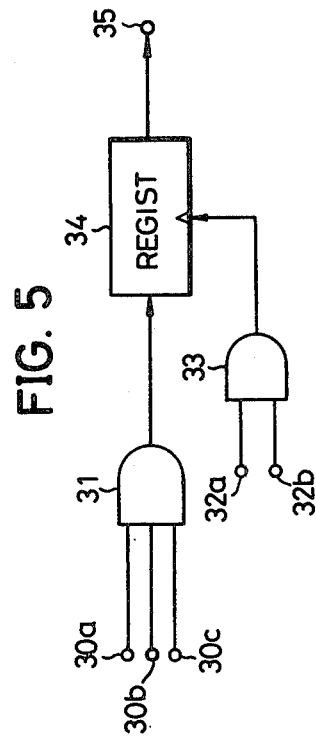
FIG. 5 is a systematic circuit diagram showing the essential parts of the system for defeating embodiment of an erroneous correction of the present invention.

FIG. 5 is a schematic circuit diagram showing the essential parts of an embodiment of the system according to the present invention. In FIG. 5, the result of the mathematical operation performed to determine whether the partial syndromes $S_1$, $S_2$, and $S_{12}$ are zero vectors, are respectively applied to input terminals 30a, 30b, and 30c of an AND gate 31. The signals applied to the input terminals 30a, 30b, and 30c are at low levels (logical zeros) when the above partial syndromes $S_1$, $S_2$, and $S_{12}$ are zero vectors. Moreover, a clock pulse generated after the partial syndromes $S_1$ and $S_2$ are calculated (upon completion of a correcting operation on one block), is applied to one input terminal 32a of the two input terminals 32a and 32b of an AND gate 33. In addition, a high-level (logical "1") signal is applied to the other input terminal 32b only when the number of erroneous words N is equal to zero or one. Conventionally, four states, that is, states where the number of erroneous words of the eight words is zero, one, two, and three or more, can be detected by a discriminating circuit, and a mathematical correcting operation can be performed in the adjacent codes. Therefore, the signal obtained from the logical sum of the outputs which discriminate whether the number of erroneous words is zero or one, of the outputs supplied from the above discriminating circuit, can be used as the signal applied to this input terminal 32b.

A register 34 stores and transfers the output information signal supplied from the AND gate 31, under the control of the output pulse of the above AND gate 33. Hence, the output of the AND gate 31 becomes of high level when the three partial syndromes $S_1$, $S_2$, and $S_{12}$ respectively are not . On the other hand, when the number N of the error-detected words is zero or one, a high-level correction stopping signal is obtained from the an output terminal 35 since the clock pulse supplied from the input terminal 32a is supplied to the register 34 through the AND gate 33. In addition, when at least one of the three partial syndromes $S_1$, $S_2$, and $S_{12}$ becomes where the number N of the error-detected words is zero or one, or when all of the above partial syndromes $S_1$, $S_2$, and $S_{12}$ become where the above number N is zero, the output of the AND gate 31 becomes of low level, (logical zero) and the clock pulse supplied from the input terminal 32a is supplied to the register 34 through the AND gate 33. Accordingly, a low-level (logical zero) signal is obtained from the output terminal 35, and the correction stopped state is released.

Further, the input to the input terminal 32b becomes a low level (logical zero) when the above number N is two or more, and thus, the supplying of the clock pulse to the register 34 from the input terminal 32a is intercepted by the closing of the AND gate 33. Hence, the information stored previously is maintained within the register 34, and an erroneous correction can be prevented.

The circuit shown in FIG. 5 is provided in one part of the correcting circuit 22, when applied to a digital signal recording and/or reproducing apparatus shown in FIG. 1.

Moreover, one block in the above embodiment of the invention is constituted from six information words (information vectors) and two error correcting words of the digital signal to simplify the description, however, one block is generally constituted from n ($n < < 2^{m-1}$) information words each having m bits, and two error correcting words P and Q formed from these information words where $$P = \sum_{l=1}^{n} W_l \text{ and } Q = \sum_{l=1}^{n} T^{n+1-l} W_l$$

where T is the companion matrix of the polynomial $1+g_1x+g_2x^2+\ldots+g_{m-1}x^{m-1}+x^m$. Here, the partial syndromes $S_1$, $S_2$ and $S_{12}$ can be described by the following equations, where $l=1, 2, \ldots, n$.

$$S_1 = P \oplus \sum_{l=1}^{n} W_l, \quad S_2 = Q \oplus \sum_{l=1}^{n} T^{n+1-l} W_l,$$

$$S_{12} = S_1 \oplus T^{l-n-1} S_2$$

Further, this invention is not limited to these embodiments but various variations and modifications may be made without departing from the scope of the invention.

What is claimed is:

1. A system for defeating erroneous corrections in a digital signal reproducing apparatus, said system comprising, in combination:

reproducing means for reproducing a digital signal sequence from a recording medium, said recording medium having a sequence of digital signals recorded thereon in a plurality of blocks of data, each of said data blocks including a digital signal sequence and an error-detecting cyclical redundancy check word, said digital signal sequence including n m-bit information words $W_1$ through $W_n$ and two error correcting words P and Q which satisfy the following equations:

$$P = W_1 \oplus W_2 \oplus W_3 \oplus \ldots \oplus W_{n-1} \oplus W_n$$

and $Q = T^n \cdot W_1 \oplus T^{n-1} \cdot W_2 \oplus \ldots \oplus T^2 \cdot W_{n-1} \oplus T \cdot W_n$ or $Q = T \cdot W_1 \oplus T^2 \cdot W_2 \oplus \ldots \oplus T^{n-1} \cdot W_{n-1} \oplus T^n \cdot W_n$ and which are interleaved, where: m and n are integers satisfying a relation $2^{m-1} > > n$, the symbol "$\oplus$" indicates a modulo-2 addition, and T is a companion matrix of a polynomial $1+g_1x+g_2x^2+\ldots+g_{m-1}x^{m-1}+x^m$, said information words $W_1$ through $W_n$ being a digital modulation responsive to an analog information signal and a resultant digital information signal divided into predetermined sections, said error-detecting cyclical redundancy check word indicating a number of erroneous words in each of said blocks made up of interleaved words;

memory circuit means for storing the digital signal sequence reproduced from said recording medium by said reproducing means, and for producing a digital signal sequence which includes the information words $W_1$ through $W_n$ and the error correcting words P and Q which are de-interleaved and arranged in an original sequence;

correcting circuit means for carrying out adjacent error corrections with respect to the digital signal sequence produced from said memory circuit means by a use of error pointers, and for correcting errors of up to two words in each of a plurality of blocks made up of the de-interleaved words, said error pointers being formed from said error detecting cyclical redundancy check words and indicating erroneous words in each of said blocks made up of de-interleaved words; and digital-to-analog converter means for converting a digital information signal obtained from said correcting circuit means into the original analog information signal, said correcting circuit means calculating partial syndromes $S_1$, $S_2$, and $S_{12}$ according to the following equations:

$$S_1 = P \oplus W_1 \oplus W_2 \oplus \ldots \oplus W_{n-1} \oplus W_n$$

$$S_2 = Q \oplus T^n \cdot W_1 \oplus T^{n-1} \cdot W_2 \oplus \ldots \oplus T^2 \cdot W_{n-1} \oplus T \cdot W_n$$

or $S_2 = Q \oplus T \cdot W_1 \oplus T^2 \cdot W_2 \oplus \ldots \oplus T^{n-1} \cdot W_{n-1} \oplus T^n \cdot W_n$ and $S_{12} = S_1 \oplus T^{l-n-1} \cdot S_2$ where: $l=1, 2, 3, \ldots, n$, and said correcting circuit means detecting the erroneous words in units of blocks, which are made up of the de-interleaved words, by use of said error pointers and for stopping said error correction when a number of detected erroneous words in one block, which is made up of the de-interleaved words, is equal to zero or one and all of the calculated partial syndromes $S_1$, $S_2$, and $S_{12}$, are not equal to , and continuing to stop said error correction (1) until the number of detected erroneous words becomes equal to zero and all of the partial syndromes $S_1$, $S_2$, and $S_{12}$ become equal to or (2) until the number of detected erroneous words becomes equal to zero or one and at least one of the partial syndromes $S_1$, $S_2$, and $S_{12}$ becomes equal to .

2. A system for defeating erroneous correction as claimed in claim 1 in which said correcting circuit means comprises:

first AND-gate means supplied with signals having logical values in accordance with calculated results, of the partial syndromes $S_1$, $S_2$, and $S_{12}$, second AND-gate means supplied with a clock pulse generated after the partial syndromes $S_1$ and $S_2$ have been calculated during an error correcting operation carried out for one block and with a signal which assumes a predetermined logical value if the number of erroneous words in one block is zero or one, and a register, supplied with outputs of said first and second AND-gate means, for storing and transferring the output of said first AND-gate means under control of the output of said second AND-gate means, the error correcting operation of said correcting circuit being stopped for a predetermined logical value of an output of said register.

* * * * *